US008694606B2

(12) United States Patent
Chapweske (10) Patent No.: US 8,694,606 B2
(45) Date of Patent: Apr. 8, 2014

(54) RATE SENSITIVE PACKET TRANSFER MECHANISM OVER A PEER-TO-PEER NETWORK

(71) Applicant: Google Inc., Mountain View, CA (US)

(72) Inventor: Justin F. Chapweske, Bozeman, MT (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/649,910

(22) Filed: Oct. 11, 2012

(65) Prior Publication Data

US 2013/0103728 A1   Apr. 25, 2013

Related U.S. Application Data (63) Continuation of application No. 12/901,283, filed on Oct. 8, 2010, now Pat. No. 8,312,107, which is a continuation of application No. 11/861,774, filed on Sep. 26, 2007, now Pat. No. 7,831,718, which is a continuation of application No. 10/033,305, filed on Dec. 28, 2001, now Pat. No. 7,277,950.

(60) Provisional application No. 60/258,981, filed on Dec. 29, 2000.

(51) Int. Cl.
    *G06F 15/16*  (2006.01)
(52) U.S. Cl.
    USPC .......................................................... 709/217
(58) Field of Classification Search
    USPC .......................................................... 709/217
    See application file for complete search history.

(56) References Cited

U.S. PATENT DOCUMENTS

| | | |
|---|---|---|
| 4,881,264 A | 11/1989 | Merkle |
| 6,085,251 A | 7/2000 | Fabozzi |
| 6,141,659 A | 10/2000 | Barker et al. |
| 6,339,785 B1 | 1/2002 | Feigenbaum |
| 6,477,522 B1 | 11/2002 | Young |
| 6,742,023 B1 * | 5/2004 | Fanning et al. ............... 709/219 |
| 6,771,674 B1 | 8/2004 | Schuster et al. |
| 6,772,337 B1 | 8/2004 | Yener |
| 7,047,309 B2 | 5/2006 | Baumann et al. |
| 7,133,368 B2 | 11/2006 | Zhang et al. |

(Continued)

OTHER PUBLICATIONS

Kaminsky, D., "Vectorcast: A Proposal Regarding the efficient Distribution of Data on High Bandwidth Networks," Jan. 12, 1998, 4 pages.

(Continued)

*Primary Examiner* — Oscar Louie
*Assistant Examiner* — Bryan Lee
(74) *Attorney, Agent, or Firm* — Amin, Turocy & Watson, LLP (57) ABSTRACT

An apparatus, method and system to improve data transfer across a communications network by employing an acknowledgment independent equalized data packet transfer mechanism on a peer-to-peer basis. The present disclosure teaches how many computers can send data to many other computers, with particularity on a peer-to-peer basis when desired, without requiring acknowledgements of safe receipt by the receiving computer. By aggregating several computers to send data in a collection to a requesting computer, transfer rates may be increased. Further, by not requiring acknowledgment of receipt from the receiving computer, and by treating all data packets with equal utility, the present disclosure teaches a mechanism that reduces file transfer administration bandwidth, increases file transfer scalability on demand, and increases overall network transfer efficiency.

12 Claims, 5 Drawing Sheets

(56) References Cited

U.S. PATENT DOCUMENTS

| | | | |
|---|---|---|---|
| 7,251,691 | B2 | 7/2007 | Boyd et al. |
| 7,277,950 | B1 | 10/2007 | Chapweske |
| 7,536,465 | B2 * | 5/2009 | Teodosiu et al. ............. 709/229 |
| 7,555,559 | B2 | 6/2009 | Chapweske |
| 7,812,743 | B2 | 10/2010 | Luby |
| 7,831,718 | B2 | 11/2010 | Chapweske |
| 2001/0051996 | A1 | 12/2001 | Cooper et al. |
| 2002/0003541 | A1 | 1/2002 | Boyd et al. |
| 2002/0049760 | A1 | 4/2002 | Scott et al. |
| 2002/0138443 | A1 | 9/2002 | Schran et al. |
| 2002/0178261 | A1 | 11/2002 | Chang et al. |
| 2002/0194310 | A1 | 12/2002 | Chu et al. |
| 2003/0231661 | A1 | 12/2003 | DePietro et al. |
| 2004/0172476 | A1 | 9/2004 | Chapweske |
| 2004/0193900 | A1 | 9/2004 | Nair |
| 2004/0205093 | A1 | 10/2004 | Li et al. |
| 2005/0010792 | A1 | 1/2005 | Carpentier et al. |
| 2005/0021575 | A1 | 1/2005 | Boyd et al. |
| 2006/0026161 | A1 | 2/2006 | Henseler |
| 2006/0149806 | A1 * | 7/2006 | Scott et al. ................... 709/201 |
| 2009/0327512 | A1 | 12/2009 | Chapweske |
| 2011/0128972 | A1 * | 6/2011 | Thornton et al. ............ 370/466 |

OTHER PUBLICATIONS

Francis, P., "Yallcast: Extending the Internet Multicast Architecture," Sep. 30, 1999, pp. 1-39.

Byers, J. et al., "Accessing Multiple Mirror Sites in Parallel: Using Tornado Codes to Speed Up Downloads," Apr. 1999, pp. 275-283.

Dessent, Brian, "Brian's BitTorrent FAQ and Guide," May 10, 2003, accessed from http://www.dessent.net/btfaq, 40 pgs.

Koman, Richard, "The Swarmcast Solution," May 24, 2001, accessed from http://openp2p.com/lpt/a/883, 4 pgs.

Office Action for U.S. Appl. No. 10/788,695, mailed Aug. 8, 2008, 14 pages.

Padmanabhan, et al., "Distributing Streaming Media Content Using Cooperative Networking," Proceedings of the 12th International Workshop on Network and Operating Systems Support for Digital Audio: NOSSDAV, May 12-14, 2002, pp. 177-186.

Byers, et al., "A Digital Fountain Approach to Reliable Distribution of Bulk Data," Proc. ACM SIGCOMM, ACM Press, New York, 1998, pp. 56-67.

Goyal, V.K., "Multiple Description Coding: Compression Meets the Network," IEEE Signal Processing Magazine, vol. 18, 2001, pp. 74-93.

Chu, et al., "A Case for End System Multicast," Proceedings ACM SIGMETRICS 2000: International Conference on Measurement and Modeling of Computer Systems, Jun. 17-21, 2001, pp. 1-12.

Office Action for U.S. Appl. No. 10/033,305, mailed Mar. 7, 2005, 6 pages.

Final Office Action for U.S. Appl. No. 10/033,305, mailed Oct. 5, 2005, 9 pages.

Office Action for U.S. Appl. No. 10/033,305, mailed Apr. 28, 2006, 13 pages.

Office Action for U.S. Appl. No. 10/033,305, mailed Feb. 27, 2007, 11 pages.

Office Action for U.S. Appl. No. 11/861,774, mailed Sep. 18, 2009, 14 pages.

Responsive Amendment dated Jul. 7, 2005 for U.S. Appl. No. 10/033,305, 25 pgs.

Responsive Amendment dated Feb. 6, 2006 for U.S. Appl. No. 10/033,305, 31 pgs.

Responsive Amendment dated Jul. 25, 2006 for U.S. Appl. No. 10/033,305, 25 pgs.

Responsive Amendment dated May 29, 2007 for U.S. Appl. No. 10/033,305, 34 pgs.

Responsive Amendment dated Dec. 16, 2009 for U.S. Appl. No. 11/861,774, 12 pgs.

Schwartz, et al., "Negotiation on Data Allocation in Multi-Agent Environments," 1997, 7 pages.

Notice of Allowance from U.S. Appl. No. 12/490,128, dated Sep. 20, 2011, 6 pp.

Notice of Allowance for U.S. Appl. No. 12/901,283, dated Jul. 11, 2012, 19 pages.

Office Action for U.S. Appl. No. 12/901,283, dated Sep. 29, 2011, 22 pages.

Office Action for U.S. Appl. No. 12/901,283, dated Mar. 31, 2011, 28 pages.

* cited by examiner

RATE SENSITIVE PACKET TRANSFER MECHANISM OVER A PEER-TO-PEER NETWORK

CROSS REFERENCE TO RELATED APPLICATIONS

This application is a continuation of U.S. patent application Ser. No. 12/901,283 filed Oct. 8, 2010 titled "RATE SENSITIVE PACKET TRANSFER MECHANISM OVER A PEER-TO-PEER NETWORK" which is a continuation of U.S. patent application Ser. No. 11/861,774 filed Sep. 26, 2007 titled "RATE SENSITIVE PACKET TRANSFER MECHANISM OVER A PEER-TO PEER NETWORK" which is a continuation of U.S. patent application Ser. No. 10/033,305 filed Dec. 28, 2001 titled "APPARATUS, METHOD, AND SYSTEM FOR AN ACKNOWLEDGEMENT—INDEPENDENT EQUALIZED DATA PACKET TRANSFER MECHANISM OVER A PEER TO PEER NETWORK" which is a non-provisional application of U.S. Provisional Application Ser. No. 60/258,981 filed Dec. 29, 2000 titled "APPARATUS, METHOD AND SYSTEM FOR AN ACKNOWLEDGEMENT INDEPENDENT EQUALIZED DATA PACKET TRANSFER MECHANISM OVER A PEER TO PEER NETWORK. The entireties of each are incorporated herein by reference.

FIELD

The present invention relates generally to computer systems and network transfer protocols, and more particularly to apparatuses, methods, and systems for highly scalable peer-to-peer transfer mechanisms.

BACKGROUND

Information Technology Systems

Typically, users, which may be people or other systems, engage computers to facilitate information processing. A computer operating system enables and facilitates users to access and operate computer information technology. Information technology systems provide interfaces that allow users to access and operate the various systems.
User Interface The function of computer interfaces such as cursors, menus, and window components are, in many respects, similar to automobile operation interfaces. Automobile operation interfaces such as steering wheels, gearshifts, and speedometers facilitate the access, operation, and display of automobile resources, functionality, and status. Computer interaction interfaces such as cursors, menus, and windows similarly facilitate the access, operation, and display of computer hardware and operating system resources, functionality, and status. Operation interfaces are commonly called user interfaces. Graphical user interfaces (GUIs) such as the Apple Macintosh Operating System or Microsoft's Windows provide a baseline and means of accessing and displaying information.
World Wide Web The proliferation and expansion of computer systems, databases, the Internet, and particularly the World Wide Web (the web), have resulted in a vast and diverse collection of information. Various user interfaces that facilitate the interaction of users with information technology systems (i.e., people using computers) are currently in use. An information navigation interface called WorldWideWeb.app (the web) was developed in late 1990. Subsequently, information navigation interfaces such as web browsers have become widely available on almost every computer operating system platform.

Generally, the web is the manifestation and result of a synergetic interoperation between user interfaces (e.g., web browsers), servers, distributed information, protocols, and specifications. Web browsers were designed to facilitate navigation and access to information, while information servers were designed to facilitate provision of information. Typically, web browsers and information servers are disposed in communication with one another through a communications network. As such, information servers typically provide information to users employing web browsers for navigating and accessing information about the web. Microsoft's Internet Explorer and Netscape Navigator are examples of web browsers. In addition, navigation user interface devices such as WebTV have also been implemented to facilitate web navigation. Microsoft's Information Server and Apache are examples of information servers, i.e., their function is to serve information to users that typically access the information by way of web browsers.
Network Transfer Mechanisms The proliferation and expansion of computer information systems coincides with an increase in network use. Often, transfers of data over a communications network requires the transmission of data packets. A piece of data on a computer system, for example a file, is broken up into pieces of data called packets, and sent to a destination computer system that assembles the received packets. One basic and underlying protocol for such packet transmissions is Transmission Control Protocol Internet Protocol (TCP/IP). The increased use of various communication networks has resulted in increased network traffic. Often, transfers of data over a communication network results in lost or missing data packets.

One model enabling file transfer is the peer-to-peer model. Peer-to-peer is a communications model in which each party has the same capabilities and either party can initiate a communication session. Peers are often referred to as nodes on a network.

Various transfer mechanisms and protocols exist enabling for the transfer of data from one computer system to another. There are at least two basic types of transfer mechanisms: Automatic Retransmission reQuest (ARQ) based implementations and non-ARQ implementations. ARQ based transfer mechanisms request retransmissions for packets of data that are lost in transmission. The receiving computer system triggers retransmissions by explicit or implicit (based on timeouts) ACK/NACKs. The ACK/NACKs are basically acknowledgements that a data packet was or was not successfully received. One old example of an ARQ based mechanism is File Transfer Protocol (FTP). Non-ARQ based mechanisms may sometimes use Forward Error Correction to add a level of reliability. Multicast is another transport mechanism that attempts to deliver a great amount of data to a great number of computers. (See A Reliable Multicast data Distribution Protocol based on software FEC techniques (RMDP), (with Lorenzo Vicisano, UCL), Proc. of the Fourth IEEE HAIEM'97 Workshop, Chalkidiki, Grece, June 1997 <http://www.iet.unipi.it~luigi/hAIEM97.ps.gz; and Gemmell, Jim, Schooler, Eve, and Gray, Jim, Fcast Scalable Multicast File Distribution: Caching and Parameters Optimizations, Microsoft Research Technical Report, MSR-TR-99-14, June 1999 <http://www.research.microsoft.com/~JGemmell/pubs/FcastTR-99-14.doc>).

Increased network traffic has strained current communication networks, leading to higher rates of data loss during transmission, and in turn, further worsening network transfers rates. Furthermore, new network applications increasingly involve larger sized transfers of data, which has resulted in increased bandwidth problems. The growing use of communication networks has resulted in an overall problem with regard to network transmission delivery speeds. Such network speed problems in many instances frustrate users.

SUMMARY

The invention provides a mechanism that allows peer-to-peer networks to scale to provide vast amounts of bandwidth, with low latency, and low overhead in a manner that allows for instant and great scalability. Many peer-to-peer network transfer mechanisms suffer from high overhead in sending and receiving feedback regarding data transfers. For example, if a peer on a network employing a mechanism such as Gnutella is disposed in communication with only one other node, then the overhead of acknowledging the safe receipt of a data packet may not be too large. However, as more and more nodes are disposed in communication with one another, the feedback can overwhelm the data transfer. The present invention cures this feedback problem by employing encoding schemes that require little to no feedback or acknowledgment regarding the transfer of data. Furthermore, peer-to-peer transfers have been notoriously "fragile" with mechanisms such as Gnutella because each data packet does not have equal utility. If you are sending a file with a million packets, and the $999,999^{th}$ packet is lost, the entire file will be rendered corrupt. Thus, the more time someone has invested in a data transfer, the more valuable the packets the user receives become. The present invention overcomes this problem by employing encoding schemes that allow for the reconstruction of the complete data, even when all data packets are not received, thereby further reducing feedback overhead; this has the effect of equalizing value while maximizing the utility for any randomly received data packet. These novel innovations and others through the disclosure allow peers on a network to highly leverage their data, bandwidth, and network resources in ways never before possible.

In one non-limiting example embodiment of the present invention is a method of using a computer, which involves the following: sending a request for data to a targeted computer system, determining if the data is in a look-up list that references other computers having the requested data, sending the request to the other computers having the requested data, encoding the data using an acknowledgement independent equalized data packet encoding scheme, sending the encoded data to a requesting user, receiving the encoded data from sending computers, and decoding the received encoded data.

The above advantages and features are of representative embodiments only, and are not exhaustive and/or exclusive. They are presented only to assist in understanding the invention. It should be understood that they are not representative of all the inventions defined by the claims, to be considered limitations on the invention as defined by the claims, or limitations on equivalents to the claims. For instance, some of these advantages may be mutually contradictory, in that they cannot be simultaneously present in a single embodiment. Similarly, some advantages are applicable to one aspect of the invention, and inapplicable to others. Furthermore, certain aspects of the claimed invention have not been discussed herein. However, no inference should be drawn regarding those discussed herein relative to those not discussed herein other than for purposes of space and reducing repetition. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

The accompanying drawings illustrate certain embodiments of the disclosure.

DETAILED DESCRIPTION

AIEM Node Controller

Figure 1:
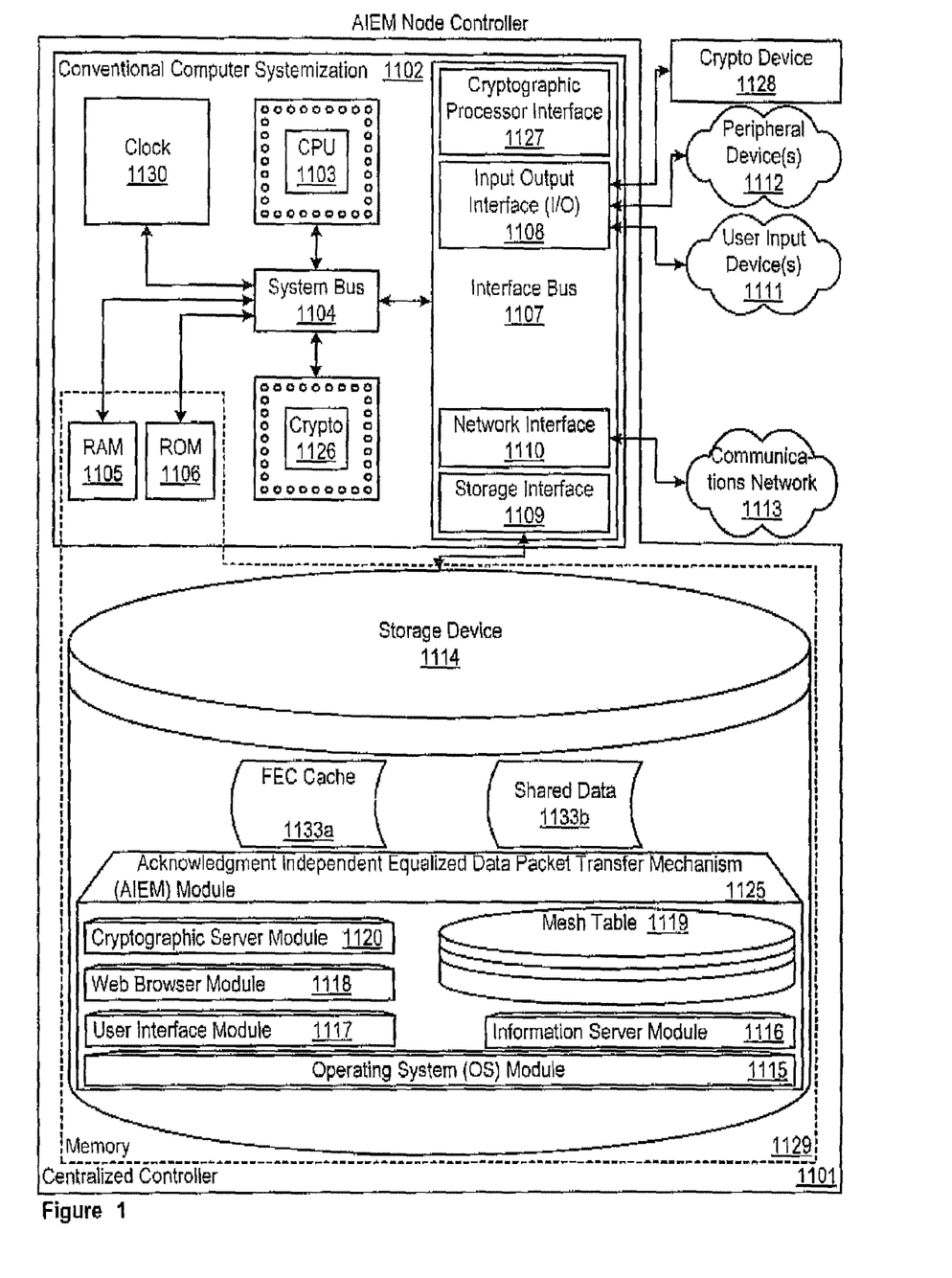
FIG. 1 illustrates an acknowledgment independent equalized data packet transfer mechanism (AIEM) node controller according to one embodiment.

FIG. 1 illustrates one embodiment incorporated into an AIEM node controller.

In this embodiment, the AIEM node controller 1101 may be connected to and/or communicate with entities such as, but not limited to: one or more users from user input devices 1111; peripheral devices 1112; and/or a communications network 1113. The AIEM node controller may even be connected to and/or communicate with a cryptographic processor device 1128.

A typical AIEM node controller 1101 may be based on common computer systems that may comprise, but are not limited to, components such as: a conventional computer systemization 1102 connected to a storage device 1114. Storage devices may be a fixed hard disk drive, and/or other devices of the like.

A conventional computer systemization 1102 may comprise a clock 1130, central processing unit (CPU) 1103, a read only memory (ROM), a random access memory (RAM), and/or an interface bus 1107, and conventionally, although not necessarily, are all interconnected and/or communicating through a system bus 1104. The system clock typically has a crystal oscillator and provides a base signal. The clock is typically coupled to the system bus and various means known to those skilled in the art will increase or decrease the base operating frequency for other components interconnected in the conventional computer systemization. The clock and various components in a conventional computer systemization drive signals embodying information throughout the system. Optionally, a cryptographic processor 1126 may similarly be connected to the system bus. Of course, any of the above components may be connected directly to one another, connected to the CPU, and/or organized in numerous variations employed as exemplified by conventional computer systems.

A conventional computer systemization may employ various forms of memory 1129. In a typical configuration, memory will include ROM, RAM, and a storage device. Non-conventional software modules such as an AIEM Module 1125, may be loaded into memory.

The CPU comprises at least one high-speed data processor adequate to execute program modules for executing user and/or system-generated requests. The CPU is a conventional microprocessor such as the Intel Pentium Processor and/or the like. The CPU interacts memory to execute stored program code according to conventional data processing techniques.

Interface bus(ses) 1107 may accept, connect, and/or communicate to a number of interface adapters, conventionally although not necessarily in the form of adapter cards, such as but not limited to: input output interfaces (I/O) 1108, storage interfaces 1109, network interfaces 1110, and/or the like. Optionally, cryptographic processor interfaces 1127 similarly may be connected to the interface bus. The interface bus provides for the communications of interface adapters with one another as well as with other components of the conventional computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (PCI), Personal Computer Memory Card International Association (PCMCIA), and/or the like.

Storage interfaces 1109 may accept, communicate, and/or connect to a number of storage devices such as, but not limited to: storage devices 1114, removable disc devices, and/or the like. Storage interfaces may employ connection protocols such as, but not limited to: (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1110 may accept, communicate, and/or connect to a communications network 1113. Network interfaces may employ connection protocols such as, but not limited to: Bluetooth, direct connect, Ethernet (thick, thin, twisted pair 10/100/1000 Base T, and/or the like), IEEE 802.11b, Token Ring, wireless connection, and/or the like. A communications network may be: a direct connection; the Internet; a Local Area Network (LAN); a secured custom connection; a Wide Area Network (WAN); a wireless network (e.g., employing protocols such as, but not limited to a Wireless Application Protocol (WAP), I-mode, etc.); and/or the like. A network interface may be regarded as a specialized form of an input output interface.

Input Output interfaces (I/O) 1108 may accept, communicate, and/or connect to user input devices 1111, peripheral devices 1112, cryptographic processor devices 1128, and/or the like. I/O may employ connection protocols such as, but not limited to: Apple Desktop Bus (ADB); Apple Desktop Connector (ADC); audio: analog, digital, monaural, RCA, stereo, and/or the like IEEE 1394; infrared; joystick; keyboard; midi; optical; PC AT; PS/2; parallel; radio; serial; USB; video: BNC, composite, digital, RCA, S-Video, VGA, and/or the like; wireless; and/or the like. A common output device is a video display, which typically comprises a CRT with an interface (e.g., VGA circuitry and cable) that accepts signals from a video interface. The video interface composites information generated by a conventional computer systemization and generates video signals based on the composited information. Typically, the video interface provides the composited video information through a video connection interface that accepts a video display interface (e.g., a VGA connector accepting a VGA display cable).

User input devices 1111 may be card readers, dongles, finger print readers, gloves, graphics pads, joysticks, keyboards, mouse (mice), trackballs, trackpads, retina readers, and/or the like.

Peripheral devices 1112 may be connected and/or communicate with or to I/O and/or with or to other facilities of the like such as network interfaces, storage interfaces, and/or the like). Peripheral devices may be cameras, dongles (for copy protection, ensuring secure transactions as a digital signature, and/or the like), external processors (for added functionality), goggles, microphones, monitors, network interfaces, printers, scanners, storage devices, visors, and/or the like.

Cryptographic units such as, but not limited to, microcontrollers, processors 1126, interfaces 1127, and/or devices 1128 may be attached, and/or communicate with the AIEM node controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 284.

A storage device 1114 may be any conventional computer system storage. Commonly a storage device is a fixed hard disk. However, it is to be understood that a conventional computer systemization may be configured to employ many types of memory 1129. For example, a conventional computer systemization may be configured wherein the functionality of on-chip CPU memory (e.g., registers), RAM, ROM, and any other storage devices are provided by a paper punch tape or paper punch card mechanism; of course such an embodiment is not preferred and would result in an extremely slow rate of operation. Generally, any mechanization and/or embodiment allowing a processor to affect the storage and/or retrieval of information is memory 1129. Thus, a conventional computer systemization generally requires and makes use of memory. However, memory is a fungible technology and resource, thus, any number of memory embodiments may be employed in lieu of or in concert with one another.

The storage devices 1114 may contain a collection of program and/or database modules and/or data such as, but not limited to: an operating system module 1115 (operating system); an information server module 1116 (information server); a user interface module 1117 (user interface); a web browser module 1118 (web browser); a database 1119 providing a the ability to look up data/files and identify respective computer systems housing said data/files, and or the like; a cryptographic server module 1120 (cryptographic server); Acknowledgment Independent Equalized Data Packet Transfer Mechanism (AIEM) module 1125; Forward Error Correction (FEC) Cache 1133*a* for decoding acknowledgement independent equalized data packets, an area housing data that may be shared with other nodes 1133*b*, and/or the like; and/or the like (collectively a module collection). These modules may be stored and accessed from the storage devices and/or from storage devices accessible through an interface bus. Although these modules typically and preferably are stored in a local storage device, they may also be stored in peripheral devices, RAM, remote storage facilities through a communications network, ROM, and/or the like.

The operating system 1115 is executable program code facilitating the operation of an AIEM node controller. Typically, the operating system facilitates access of I/O, network interfaces, peripheral devices, storage devices, and/or the like. The operating system is a conventional product such as a Microsoft Windows, Microsoft Windows NT, Macintosh OS, Linux, Unix, and or others of the like. Preferably, the operating system is highly fault tolerant, scalable, and secure. An operating system may communicate to and/or with other modules in a module collection, including itself, and/or facilities of the like. Conventionally, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, communications networks, data, I/O, peripheral devices, program modules, memory, user input devices, and/or the like. Preferably, the operating system provides communications protocols that allow the AIEM node controller to communicate with other entities through a communications network 1113. Various communication protocols may be used by the AIEM controller as subcarrier transport mechanism, such as, but not limited to: multicast, TCP/IP, User Datagram Protocol (UDP), unicast, and or the like.

An information server module 1116 is stored program code that is executed by the CPU. The information server may be a conventional Internet information server such as, but not limited to, Microsoft's Internet Information Server and/or the Apache Software Foundation's Apache. Preferably, the information server allows for the execution of program modules through facilities such as C++, Java, JavaScript, ActiveX, Common Gateway Interface (CGI) scripts, Active Server Page (ASP), and/or the like. Preferably the information server supports secure communications protocols such as, but not limited to, Secure Hypertext Transfer Protocol (HTTPS), Secure Socket Layer (SSL), and/or the like. Conventionally, an information server provides results in the form of web pages to web browsers, and allows for the manipulated generation of the web pages through interaction with other program modules. An information server may communicate to and/or with other modules in a module collection, including itself, and/or facilities of the like. Most frequently, the information server communicates with operating systems, other program modules, user interfaces, web browsers, and/or the like. An information server may contain, communicate, generate, obtain, and/or provide program module, system, user, and/or data communications, requests, and/or responses.

A user interface module 1117 is stored program code that is executed by the CPU. Preferably, the user interface is a conventional user interface as provided by, with, and/or atop operating systems and/or operating environments such as Apple Macintosh OS, e.g., Aqua, Microsoft Windows (NT), Unix X Windows (KDE, Gnome, and/or the like), and/or the like. The user interface may allow for the display, execution, interaction, manipulation, and/or operation of program modules and/or system facilities through graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

A web browser module 1118 is stored program code that is executed by the CPU. Preferably, the web browser is a conventional hypertext viewing application such as Microsoft Internet Explorer or Netscape Navigator (preferably with 128 bit encryption by way of HTTPS, SSL, and/or the like). Some web browsers allow for the execution of program modules through facilities such as Java, JavaScript, ActiveX, and/or the like. Web browsers and like information access tools may be integrated into PDAs, cellular telephones, and/or other mobile devices. A web browser may communicate to and/or with other modules in a module collection, including itself, and/or facilities of the like. Most frequently, the web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a web browser and information server, a "clerver" may be developed to perform similar functions of both. A clerver would similarly affect the obtaining and the provision of information to users, user agents, and or the like from AIEM enabled nodes. The clever may be nugatory on systems employing standard web browsers. For added security, such a clerver module could be configured to communicate directly with the AIEM without an intermediary information server to further enhance security.

A Mesh Table module 1119 may be embodied in a database that is stored program code that is executed by the CPU and it is stored data; the stored program code portion configuring the CPU to process the stored data. Alternatively, the Mesh Table may be implemented using various standard data structures, such as a list, array, struct, and or the like. If the Mesh Table is implemented as a data structure, the use of the Mesh Table may be integrated into another module such as the AIEM module. A Mesh Table may communicate to and/or with other modules in a module collection, including itself, and/or facilities of the like. Most frequently, the Mesh Table communicates with an AIEM module, other program modules, and/or the like. The database may contain, retain, and provide information regarding other nodes and data.

A cryptographic server module 1120 is stored program code that is executed by the CPU 1103, cryptographic processor 1126, cryptographic processor interface 1127, cryptographic processor device 1128, and/or the like. Preferably, cryptographic processor interfaces will allow for expedition of encryption and/or decryption requests by the cryptographic module; however, the cryptographic module, alternatively, may run on a conventional CPU. Preferably, the cryptographic module allows for the encryption and/or decryption of provided data. Preferably, the cryptographic module allows for both symmetric and asymmetric (e.g., Pretty Good Protection (PGP)) encryption and/or decryption. Preferably, the cryptographic module allows conventional cryptographic techniques such as, but not limited to: digital certificates (e.g., X.509 authentication framework), digital signatures, dual signatures, enveloping, public key management, and/or the like. Preferably, the cryptographic module will facilitate numerous encryption and/or decryption protocols such as, but not limited to: Data Encryption Standard (DES), Elliptical Curve Encryption (ECC), International Data Encryption Algorithm (IDEA), Message Digest 5 (MD5, which is a one way hash function), RC5 (Rivest Cipher), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. A cryptographic module may communicate to and/or with other modules in a module collection, including itself, and/or facilities of the like. Preferably, the cryptographic module supports encryption schemes allowing for the secure transmission of information across a communications network to enable an AIEM module to engage in secure transactions if so desired by users. Most frequently, the cryptographic module communicates with information servers, operating systems, other program modules, and/or the like. The cryptographic module may contain, communicate, generate, obtain, and/or provide program module, system, user, and/or data communications, requests, and/or responses.

An AIEM module 1125 is stored program code that is executed by the CPU. Generally, the AIEM affects obtaining and the provision of communication, information, transactions, and/or the like between nodes. The AIEM adds the ability to receive and send files to nodes in a distributed manner that is acknowlegement independent and where data packet utility has been equalized. Generally, the AIEM acts as an data transfer mechanism for sending and receiving data. The AIEM coordinates with the Mesh Table to identify nodes that may be useful in improving data transfer for requested data. A AIEM enabling transfers between nodes maybe be developed by employing standard development tools such as, but not limited to: C++, shell scripts, Java, Javascript, SQL commands, web application server extensions, Apache modules, Perl scripts, binary executables, and/or other mapping tools, and/or the like. In one non-limiting example embodiment, the AIEM server employs a cryptographic server to encrypt and decrypt communications. The AIEM may service requests, store requested data, cease servicing requests, and much more. An AIEM module may communicate to and/or with other modules in a module collection, including itself, and/or facilities of the like. Most frequently, the AIEM module communicates with a Mesh Table, information servers, operating systems, other program modules, and/or the like. The AIEM server may contain, communicate, generate, obtain, and/or provide program module, system, user, and/or data communications, requests, and/or responses.

The functionality of any of the AIEM node controller components may be combined, consolidated, and/or distributed in any number of ways to facilitate development and/or deployment. Similarly, the module collection may be combined in any number of ways to facilitate deployment and/or development. To accomplish this, one must simply integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load balancing data processing techniques. Furthermore, single instances may also be distributed across multiple controllers and/or storage devices; e.g., databases.

All program module instances and controllers working in concert may do so through standard data processing communication techniques.

The preferred node controller configuration will depend on the context of system deployment. Factors such as, but not limited to, the capacity and/or location of the underlying hardware resources may affect deployment requirements and configuration. Regardless of if the configuration results in more consolidated and/or integrated program modules, results in a more distributed series of program modules, and/or results in some combination between a consolidated and/or distributed configuration, communication of data may be communicated, obtained, and/or provided. Instances of modules (from the module collection) consolidated into a common code base from the program module collection may communicate, obtain, and/or provide data. This may be accomplished through standard data processing techniques such as, but not limited to: data referencing (e.g., pointers), internal messaging, object instance variable communication, shared memory space, variable passing, and/or the like (intra-application communication).

If module collection components are discrete, separate, and/or external to one another, then communicating, obtaining, and/or providing data with and/or to other module components may be accomplished through standard data processing techniques such as, but not limited to: Application Program Interfaces (API) information passage; (distributed) Component Object Model ((D)COM), (Distributed) Object Linking And Embedding ((D)OLE), and/or the like), Common Object Request Provider Architecture (CORBA), process pipes, shared files, and/or the like (inter-application communication). Again, the preferable embodiment will depend upon the context of system deployment.

AIEM Node Controllers

Figure 2:
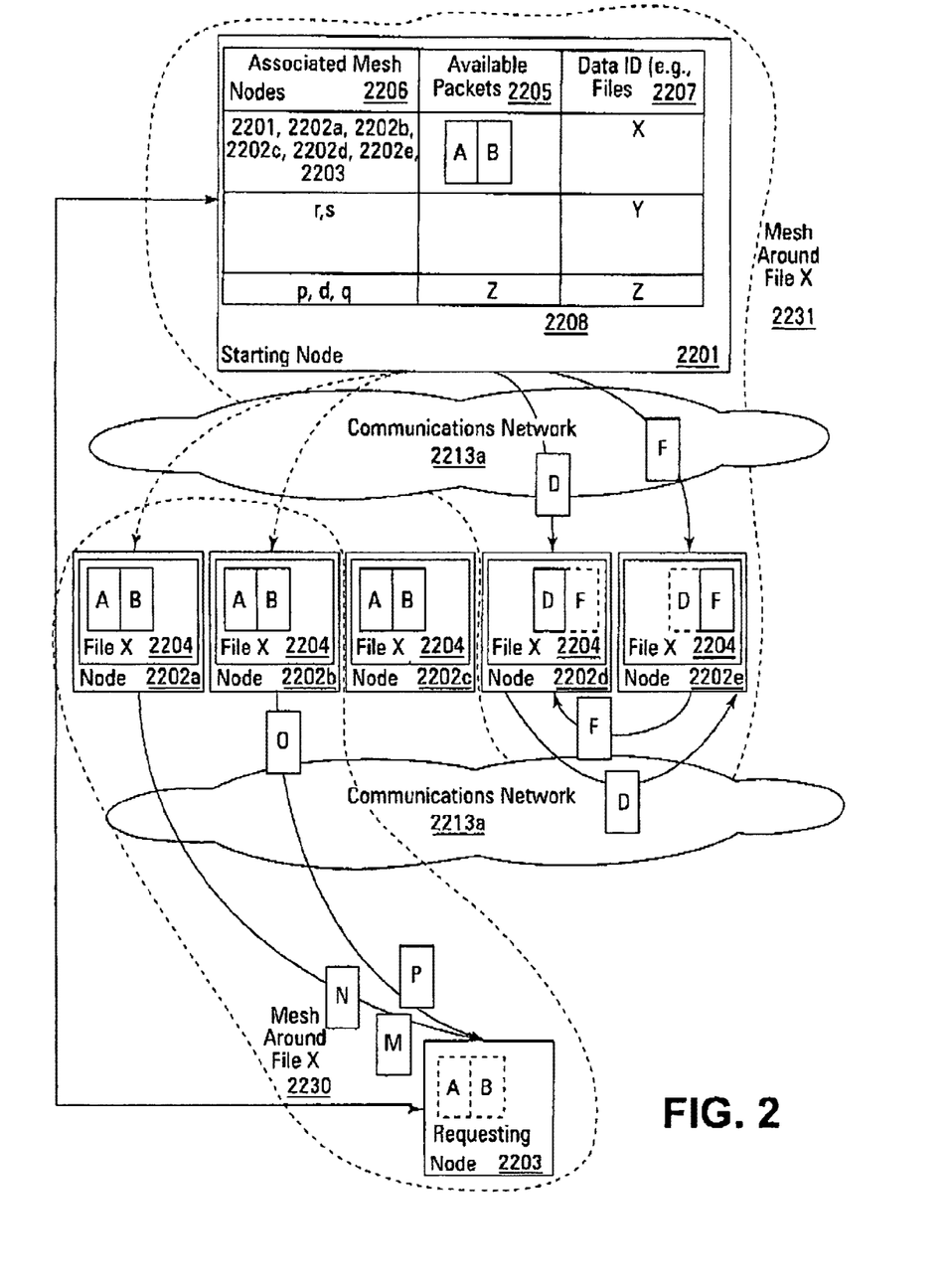
FIG. 2 illustrates an example of nodes excerpted from a network topology transferring a file from peer-to-peer.

FIG. 2 illustrates an example of nodes excerpted from a network topology transferring a file from peer-to-peer. In this embodiment, various nodes, configured similarly to the AIEM node controller 1101 embodiment of FIG. 1, are disposed in communication with one another through a communications network 2113. Each node maintains its own Mesh Table 2208 as pictured in the starting node 2201. The Mesh Table may be implemented as a database 1119 of FIG. 1 by creating a two-column table with data identifiers 2207 that relate to at least one or more associated nodes 2206. In an alternative embodiment, the Mesh Table may employ a third field tracking available packets 2205 associated with the data identifier 2207. An available packet field is useful as it allows nodes to start servicing and providing parts of a file, even when the entire file itself has not yet been downloaded from elsewhere. Nodes 2202*d*, 2202*e*, and 2203 all have incomplete files demarcated by hollow boxes representing packets that have yet to be decoded. Thus packets D, F, O, P, N, and M are all encoded versions of original un-encoded packets A, and B. Un-encoded packets are represented by shaded boxes, e.g., packets A and B. Packets that have been received at a node are demarked by boxes with solid lines; e.g., packets A and B at nodes 2202*a*, 2202*b*, 2202*c*, and 2201; un-encoded packet D at node 2202*d*; and un-encoded packet F at node 2202*e*.

In one example, the starting node 2201 references that file X has successfully been received an decoded packet into original packets A and B, which is reflected in the available packets column 2205 for file X. In one embodiment, the available packet data stored in an available packet field in a Mesh Table, may simply be a number representing a packet segment in a sequence, and or the like.

All the nodes that relate to a particular file are members of an associated mesh. Thus, for example, the starting node may have a file identified as "X" that references associated mesh nodes "2201," "2202*a*," "2202*b*," "2202*c*," 2202*d*," "2202*e*," and "2203" 2206. The actual values stored in an associated mesh node field may be network addresses that reference nodes known to contain the associated file. For example, nodes "2201," "2202*a*," "2202*b*," "2202*c*," 2202*d*," and 2202*e*," and "2203" are all known to hold at least a part of file "X" while none of those nodes holds files Y or Z. The network address may be a simple IP address, and or the like. In an alternative embodiment, the Mesh Table may be implemented in various data structures, such as, but not limited to, a list, an array, and or the like. The data identifier may be a simple file name referencing files in a node's local memory. In an alternative embodiment a Secure Hash Algorithm (SHA-1) is employed to generate a unique identifier based on data (file)

content, which is also used to reference a file in a node's local memory. Various other naming and identification techniques may also be used.

In one non-limiting embodiment of an example AIEM network transaction, initially, a requesting node 2203 may provide an initial request for a file, e.g., "X," to a starting node 2201. It is important to note that there need not be any substantial, or any, difference in configuration and operation between the starting nodes and any other nodes on the network. In a very real sense, all the nodes on the network are peers, and vary substantially only in the data they house and reference. Thus, a starting node may be any node on a LAN referencing little and narrowly tailored data sets, or it may be a mega ISP/Internet Portal referencing vast data sets. Of course each node may also vary in capacity with greater or lower memory and/or processing abilities, but interactions may proceed in similar fashion for all nodes. In an alternative embodiment, one may tailor nodes for certain data sets and performance optimizations that may change some of the internal workings of the each node, but basic interaction between nodes will be maintained. In one embodiment, a user running AIEM enabled software will have a default starting node supplied for an initial request to kick start and populate the new node's Mesh Table.

The requesting node's 2203 request may be generated by a software module capable of forming an HTTP request, and or like protocol, and sending it to a desired target node. In one non-limiting example, a web browser may be employed. The starting node 2201 receives the request for data from the requesting node 2203 and processes it. Each node has the equivalent of an information server running on it that is capable of receiving requests and provides facilities to process the request and respond to it. In one alternative embodiment, the message generation and message receipt are handled by a single software module called a "clerver," which represents both client and server functionalities in one unit. This clever ability allows for the simultaneous sending and receiving of data packets.

Returning to the example, upon having received the request for data, for example a request by the requesting node 2203 of the starting node 2201 for file "X," the starting node 2203 may distribute the task of sending file "X" to nodes associated with file "X" in its Mesh Table 2208. Next, the starting node determines a set of nodes to aid in transferring file "X" to the requesting node. How those nodes are selected from the Mesh Table will be discussed in greater detail with regard to FIGS. 3A-3C. The selected mesh nodes may be sent as a list of nodes in HTML, plain text, data structures, and or the like.

In one embodiment, not pictured in FIG. 2 for purposes of figure clarity, the starting node will send selected mesh nodes to the requesting node 2203 in a list. The requesting node will then receive a Mesh List sent from the starting node 2201. The requesting node will then integrate the received Mesh List into its own Mesh Table. A sent Mesh List may be incorporated into a node's Mesh Table by parsing the list, and selecting a data identifier and associated mesh nodes. Thereafter, based on the data identifier, the associated mesh nodes from the Mesh List may be added into the Mesh Table so that they maintain an association with the data identifier. If the Mesh Table does not have a data identifier matching one sent in the Mesh List, a new data identifier entry is created in the Mesh Table and the associated nodes from the Mesh List are parsed from the Mesh List and are entered into associated mesh node 2207 fields.

Next, the requesting node will then itself directly request file "X" across a communications network 2113*b* from the selected nodes as returned in the Mesh List. In an alternative embodiment, i.e., the "push" model, the starting node 2201 directly messages the selected mesh nodes across a communications network 2213*a* to start transferring file "X" to the requesting node (as depicted by dashed arrows to nodes 2202*a*, 2202*b* from node 2201). In our example, the starting node selected nodes 2202*a* and 2202*b* to form a mesh with the requesting node 2203 forming a mesh 2230 around file "X" denoted by a dashed line surrounding nodes "2202*a*," "2202*b*," and "2203." Nodes 2202*a*, 2202*b* have file "X" 2204 stored in memory in an un-encoded stat, and upon receiving a request for the file, the nodes 2202*a*, 2202*b* encode the file using a an acknowledgement independent equalized data packet encoding scheme.

In one non-limiting example, FEC encoding is employed. FEC employs a (k, n) block erasure code where k is less than or equal to n. Basically, using FEC, one takes k un-encoded source packets of data, and produces n encoded packets. The n packets are encoded in such a way that receiving computer need only receive k number of the n encoded packets to decode and recreate the original data. In an alternative embodiment, optimized FEC require slightly greater than k number of received encoded packets to decode and recreate the original data, e.g., tornado codes.

In this example, the file is encoded into four packets, N, M, O and P. Let's assume for purposes of example k is equal to 2 and n is much larger than k. This means that as long as a node receives any two different encoded packets, the entire file may be decoded and recreated back into the original state of file "X" (A+B) and stored in memory.

Upon having encoded file "X," each of the nodes 2202*a*, 2202*b* begins sending encoded data packets to the requesting node 2203 across a communications network 2213*b*. In this example, node 2202*a* has sent encoded packets of "X" M and N. Node 2202*a* seems to be a low latency and high bandwidth node as the packets will be arriving faster and with greater density than encoded packets sent from node 2202*b*. The likely result is that the requesting node will first receive packet M from node 2202*a* and then packet P from node 2202*b*. Upon obtaining the required k=2 packets, the requesting node may begin decoding the received packets M+P and recreating the original file "X" even before additional packets N 2202*a* and O 2202*b* arrive. As each encoded packet arrives, both sending and receiving nodes may update their respective Mesh Tables to reflect that the receiving node is now in possession of the received packets and or file. Updating Mesh Tables on a per packet basis has the advantage that a receiving node may now service other nodes requesting the data, which in turn decreases network latency while improving network throughput. The available packets field may track available packets and identify if the available packets are in an encode or decoded state. Decoded packets may again be re-encoded and sent on to requesting nodes on demand.

In another non-limiting example of a file request transaction, a mesh 2231 is formed around nodes 2202*d*, 2202*e* and 2201, wherein nodes 2202*d*, and 2202*e* have both requested file X from node 2201. Node 2202*d* has already received encoded packet D from node 2201, while node 2202*e* has already received encoded packet F. However, because node 2201 has informed both nodes 2202*d*, and 2202*e* of each other's existence via a Mesh List, the two requesting nodes 2202*d*, 2202*e* "JOIN" one another and start exchanging data packets they have received. Thus, without further interaction from starting node 2201, node 2202*e* sends encoded packet F to 2202*d*, while node 2202*d* sends encoded packet D to node 2202*e*. Upon each of these requesting nodes obtaining packets D and F from one another, they will both have the requisite k=2 encoded data packets to recreate file X by decoding the FEC encoded packets D+F. Furthermore, in the course of interaction with starting node 2201, nodes 2202*d*, and 2202*e* may become aware of node 2203 and have node 2203 added to their Mesh Tables.

AIEM Interaction System

Figure 3A:
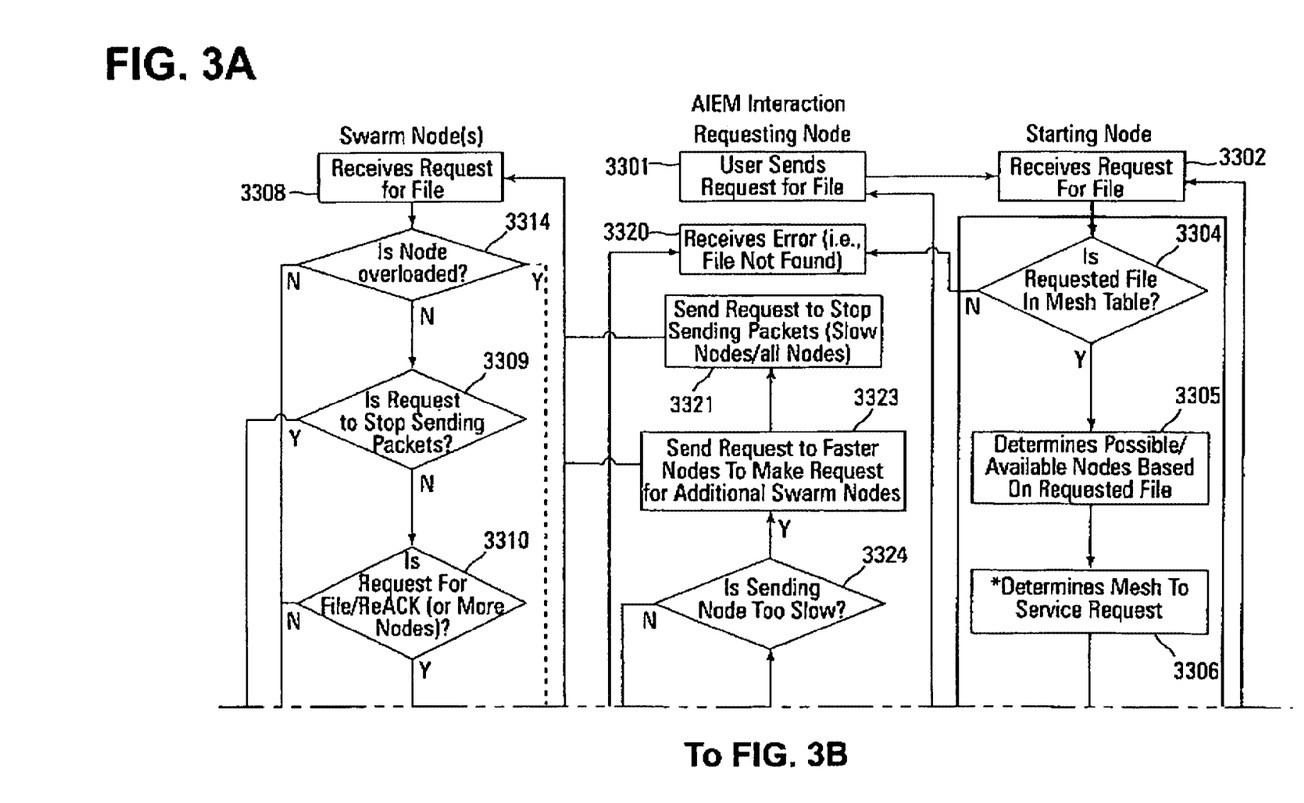
FIGS. 3A-3C are a flowchart illustrating a non-limiting example embodiment an acknowledgment independent equalized data packet transfer mechanism (AIEM).
Figure 3B:
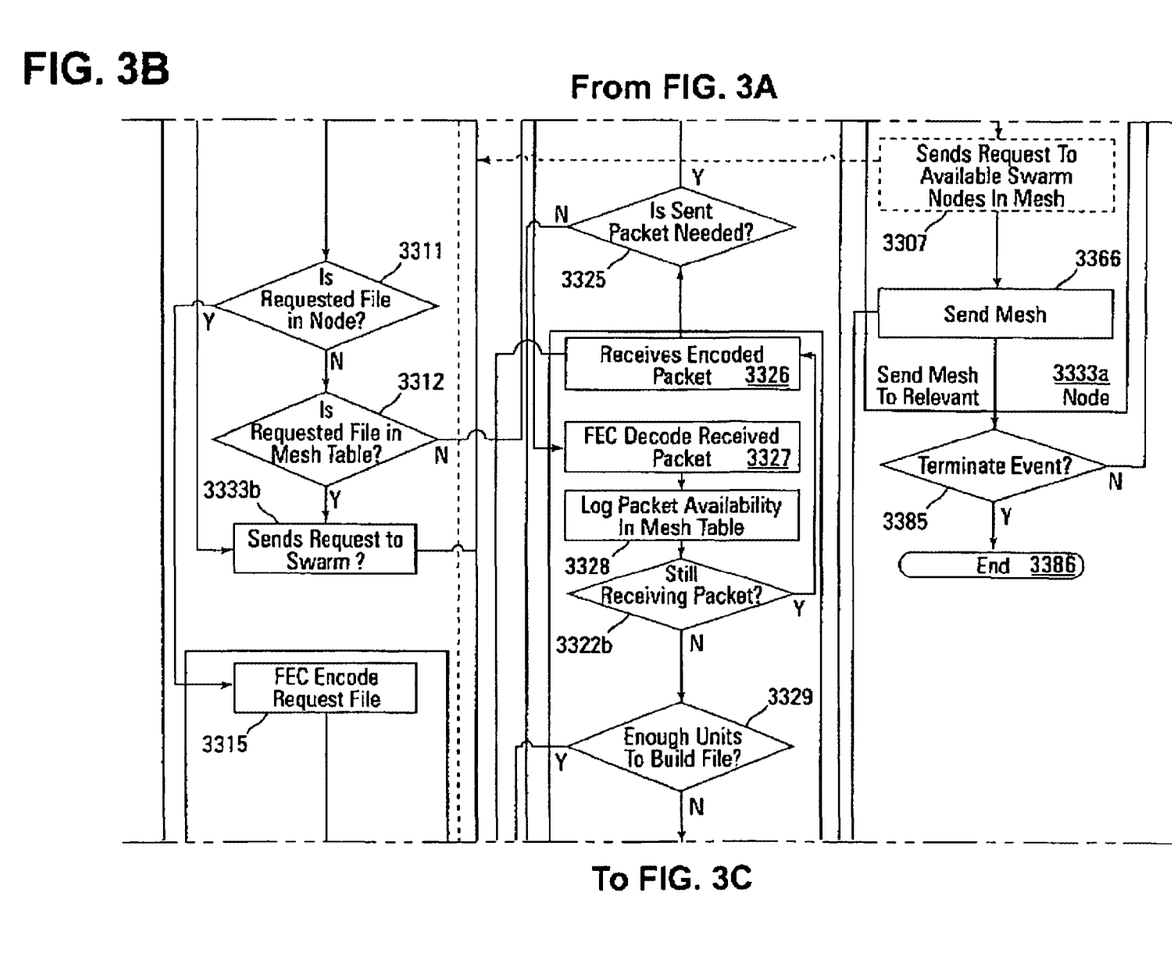
Figure 3C:
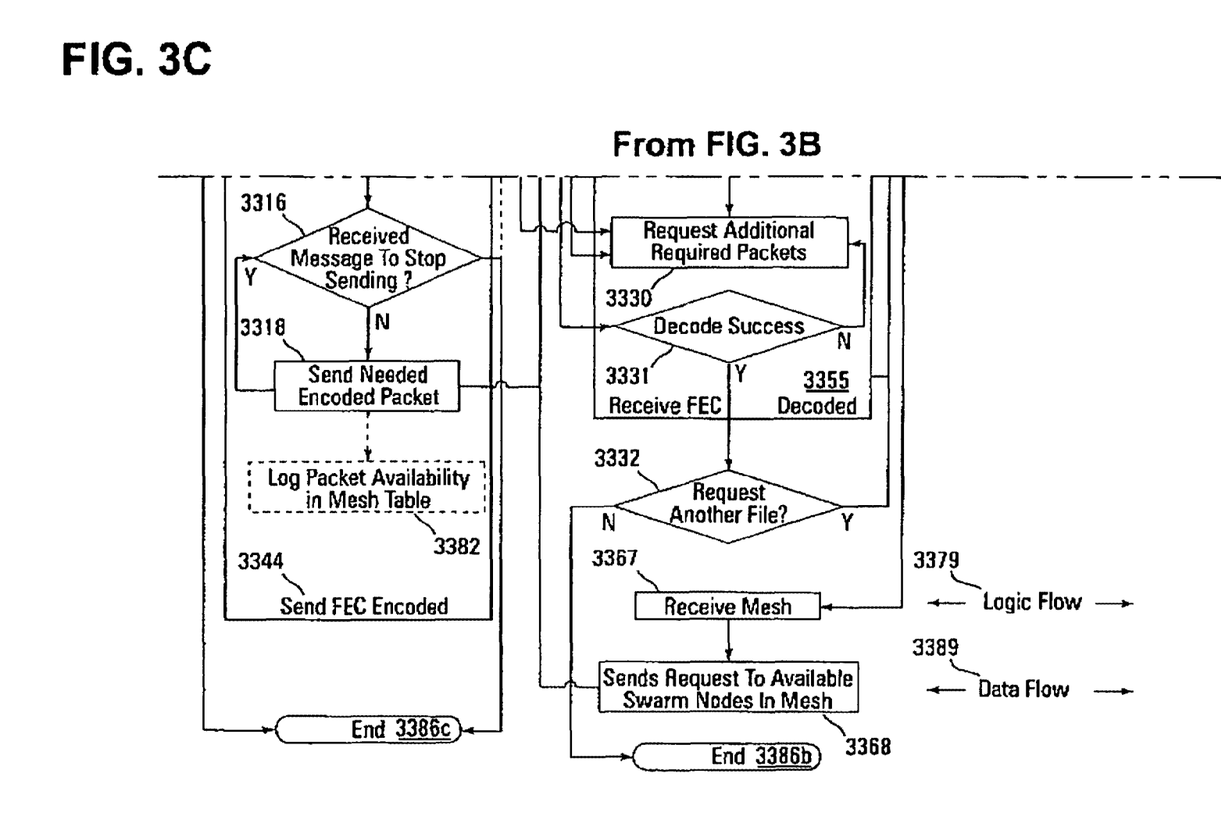

FIGS. 3A-3C shows a flowchart illustrating a non-limiting example embodiment of an acknowledgment independent equalized data packet transfer mechanism (AIEM) and various interactions. Logical flow is represented by arrows with solid arrow heads 3379, while data flow is represented by hollow arrow heads 3389.

Requesting Node

Initially a user sends a request for a file 3301. This may be achieved by engaging a user interface module 1117 of FIG. 1, web browser module 1118 of FIG. 1, a clerver, and/or the like facility that has been adapted to interact with or employ AIEM. In one non-limiting example embodiment, a web page may be constructed with a hyperlink that contains a data identifier, and mesh nodes known to house the data referenced by the data identifier, i.e., embedding a Web List into a hyperlink If a user engages the hyperlink, the data identifier would be sent to members of the node mesh who would in turn affect the accelerated and distributed transfer of the requested file to the user. This distributed transfer of data from various nodes is swarm-like in its appearance and effect. The web browser is enabled to receive the incoming encoded packets via a plug that provides the requisite decoding functionality for any incoming packets resulting from the hyperlink executed request. In an alternative embodiment, the user selects or provides the address of a starting node. The user may then send the initial request to the starting node for desired data 3301.

Upon sending an initial request for data 3301 (for example, a user may request an a musical composition in MP3 format by the artist Elvis), the starting node receives the request for the data 3302.

Starting Node

Upon receiving the request 3302, a relevant Mesh List will be sent to relevant nodes 3333. To send a Mesh List to relevant nodes 3333, first the starting node will parse the request, extracting the desired data. In one embodiment, XML tags are employed to demark requests for files, requests to LEAVE a node, requests to JOIN a node, and or the like. Providing such commands in an XML tagged fashion eases parsing. In alternative embodiments, standard parsing, request, and distributed network messaging techniques may be employed to form and interpret requests. Upon parsing the request, the requested data is compared to entries in the starting node's Mesh Table. If the requested data does not match a data identifier in the Mesh Table 3304, an error message is sent to the requesting node 3320, for example, informing the user that no such file was found. In an alternative embodiment, fuzzy logic techniques may be employed to return potentially desired data, e.g., close spellings, etc. If the requested data does match a data identifier in the Mesh Table 3304, then the starting node determines what nodes are may service the request based on the requested data 3305. This determination may be achieved using database selects, or standard string compare data processing techniques 3305. Upon having serviceable nodes 3305, the starting node then may determine which of those serviceable nodes to include into a Mesh List for sending back to the requesting node, and/or other relevant nodes 3306. Mesh List determination 3306 will be described further below. Upon having determined and created a Mesh List 3306, the starting node may then send the Mesh List 3366 to a requesting node 3367. Upon receiving the Mesh list 3367, the requesting node may then send a request 3368 for data to all nodes determined 3306 and referenced in the received Mesh List 3308 (swarm nodes). In an alternative "push" embodiment 3307, the starting node may itself send/forward the request for data made by the user on behalf of the requesting node to swarm nodes 3308. Upon having sent the Mesh List to the relevant node 3307, 3366, 3333 (either the requesting node or swarm nodes directly, depending upon if a push variant is employed or not), the starting node determines if a terminate event has occurred 3385. For example, terminate even may be created by a user at a starting node terminating the AIEM software module. If no terminate even occurred, iteration will proceed 3302. If a termination event was logged 3385, then execution will cease 3386.

Mesh List Determination

Mesh List determination 3306 may be achieved by employing numerous selection criteria. The preferred determination scheme varies depending upon factors such as, but not limited to, underlying deployment resources, node data specialization, communication connection quality, and or the like. In one non-limiting embodiment, a node building a Mesh List will populate the Mesh List with a specified number of random nodes selected from its Mesh Table associated with the requested data 3304. The specified number may be set in a preferences panel, hardwired, based on available system resources, and or like factors. In an alternative embodiment, the Mesh List building node will populate a Mesh List with all nodes selected from its Mesh Table associated with the requested data.

In an alternative embodiment, the Mesh List building node will populate a Mesh List with nodes selected from its Mesh Table associated with the requested data (earmarked nodes), wherein the selected nodes are deemed to have the best data transfer rates. Determination of transfer rates may be achieved by employing a hill-climbing analysis of earmarked nodes. In one example embodiment, the Mesh List building node will test all earmarked nodes. In another example embodiment, the Mesh List building node will select a subset of earmarked nodes at random and test their transfer rates. Testing of transfer rates may be achieved by simple pinging, logging and analyzing any return trip times. Alternatively, testing of transfer rates may be achieved by requesting a specified number of packets from the earmarked nodes. Earmarked nodes may be disqualified if their response time is too slow, if they send too many duplicate packets, and or the like undesirable transfer factors. When the transfer rates of the earmarked nodes are identified, the Mesh List building node may populate the Mesh List with a specified number of the highest performing nodes based on the hill climbing results.

In one non-limiting example embodiment of the hill-climbing test, the Mesh List building node will send out a request to earmarked (or specified subset thereof) nodes simultaneously and identify a further specified number of top performing nodes. For example, the Mesh List building node may query 20 earmarked nodes, and then further identify the top 5 performing nodes. Thereafter, the Mesh List building node may send a request to those top (5) performing nodes for another top 20 nodes each. Based on those results, the Mesh List building node may then again test the performance of a specified number of the returned (100) nodes and identify a new set of top performing (5) nodes. This hill stepping iteration may go on for a specified number of iterations, until the top nodes remain high static and or other hill step terminating indicia of the like. In an alternative embodiment, the worst performing nodes and average performing nodes are also identified and used to populate the final resulting Mesh List that is to be sent 3366, 3307 by the Mesh Building node. By injecting average and poorly performing nodes, i.e., by providing a Mesh List with a mix of node level performance, there is an increased chance that the "gene pool" of results will stay varied and thus return a greater diversity of results.

Swarm Nodes

Each individual swarm node, upon having received a request for data from a requesting (or even starting) node 3308, will first determine if it is overloaded 3314. A node may be overloaded in that its send, receive, and/or computational resources are saturated, or it has been made otherwise unavailable. If that is the case, the swarm node may re/send the received request 3308 to other 3308 relevant swarm members 3333b, similarly the discussion of so doing for the starting node 3333a. In an alternative embodiment, if the swarm node is overloaded 3314, servicing of the latest received request for data 3308 may simply be terminated 3386c.

If the swarm node is not overloaded 3314, then swarm node will determining if the LEAVE request has been sent to stop sending packets 3309. The swarm node may parse the request similar to the discussion of request parsing at the starting node 3333a to determine the request message content. If a LEAVE request has been made 3309, then servicing of request for data 3308 to the node supplying the LEAVE request may be terminated 3386c. If the request is not to stop sending packets 3309, the swarm node determines if the request for data 3310. If the request is not for data 3310, then the swarm node may re/send the received request 3308 to other 3308 relevant swarm members 3333b, similarly the discussion of so doing for the starting node 3333a. If the request is for data 3310, then the swarm node will determine if the requested data is still in memory at the node 3311. It is important to note that a request for data may be a new request for an entire file, a request to send an un-received file packet, and or block. Although by employing acknowledgement independent encoding the present invention does not require feedback, negotiations, and or synchronization, in alternative embodiment such file transfer acknowledgements may be employed for purposes of optimization, for example, if non-acknowledgement transfers fail to result in a successful transfer.

If the requested data is not still in memory at the node 3311, then the swarm node will determine if the requested data is referenced in the mesh table 3312, and if not send an error to the requesting node 3320. If the requested data is referenced in the mesh table 3312, then the swarm node may re/send the received request 3308 to other 3308 relevant swarm members 3333b, similarly the discussion of so doing for the starting node 3333a. if the requested data is still in memory at the node 3311, then the swarm node will begin to send Acknowledgment Independent Equalized (AIE) encoded data packets 3344. In one non-limiting example embodiment the AIE encoded data packets are encoded using FEC encoding 3344. For sake of clarity, henceforth FEC encoding will be used to provide a concrete example of AIE encoding, but it should be noted that other AIE encoding schemes may be used in place of FEC encoding.

Sending FEC encoded data 3344 begins with encoding the requested data with a FEC encoder 3315. The swarm node may then check 3316 to see if a LEAVE request has been made 3308 in the interim and if so, the swarm node may stop sending packets 3386c. If no message to stop sending encoded packets has been received 33116, then the swarm node sends another encoded packet 3318 to the requesting node 3326. Although the swarm node may encode the entire data file all at once 3315 into a FEC cache 1133a of FIG. 1, in an alternative embodiment, the swarm node only generates the next encoded packet on demand right before a send is required 3315. In an alternative embodiment, upon sending the encoded packet 3318, the swarm node's Mesh Table is updated to reflect the availability of the sent packet 3318 at the requesting node 3326. Upon sending the needed packet 3318 (or alternatively after logging packet availability 3382 in the swarm node's Mesh Table), iteration continues until a request to stop sending packets 3316 is received 3386c.

In an alternative embodiment of encoding the requested data 3315, the data may first be segmented before being sent. Segmentation may be accomplished employing standard file splitting and catenation tools and techniques (e.g., Unix tools such as sed, head, tail, cat). Upon segmenting the file into segmented blocks, each segmented block may be encoded as already discussed above 3315. The segmentation and subsequent encoding may lead to performance and latency gains somewhat similar to performance gains offered by RAID (Redundant Array of Independent Disks) striping techniques.

Requesting Node Receive

Upon receiving encoded packets 3326 from swarm nodes 3318, the requesting node determines if the received encoded packets are useful or nugatory 3325. For example, if a single swarm node sends the same encoded data packet multiple times, the packets will be useless and thrown out and the requesting node will need to obtain additional required packets 3330. When requesting additional required packets 3330, the requesting node may make a request of other swarm nodes identified in a Mesh List, or Mesh Table that the requesting node is currently not receiving data from, and send such non utilized swarm nodes a "JOIN" request for data. Also, in making the request for additional units 3330, the requesting node may also send a "LEAVE" message to the swarm nodes sending un-needed packets so that they stop sending un-needed packets 3309.

If the received encoded packet is useful for recreating the requested data 3325, then the requesting node may determine if received encoded packet was sent too slowly 3324. If data is being sent to slow from a swarm node 3324, the requesting node may try to find faster swarm nodes that it has not been utilizing in its Mesh Table and or Mesh List 3323. Also, the requesting node may send a "LEAVE" message to the slow swarm nodes 3308 requesting that the slow swarm nodes stop sending packets 3321.

If the useful 3325 encoded packet is being sent at an acceptable rate 3324, then received encoded packet will be decoded 3327 once enough packets have been accumulated to do so (via FEC and or other like encoding schemes). If enough packets have been received to decode data, that data is decoded 3327 and then that decoded data is logged as being available 3322b in the requesting node's Mesh Table. If not enough packets have been received to decode data 3327, then the encoded packet is logged as being available 3322b in the requesting node's Mesh Table. Next, the requesting node determines if it is still receiving packets 3328. If the requesting node is still receiving packets, receive decoding 3355, 3326 iteration continues. If the requesting node is not still receiving packets, the receiving node determines if there is enough received data to build the entire file 3329. This step is useful for when recombining, e.g., catenation, decoded segments in an alternative segmented embodiment as discussed above regarding segmented encoding 3315. It is also useful to determine if all the required segments have been decoded. If not enough data exists to reconstruct the complete data 3329, then a request for additional data may be made as already discussed above 3330. If there is enough data to attempt to reconstruct the data 3329, then the requesting node will determine if the file has been successfully reconstructed 3331. If the file was not successfully reconstructed 3331, then additional requests for data will be made 3330. Conversely, if the file was successfully encoded and reconstructed 3331, then the requesting node may check to see the user wishes to request another file 3332. It's important to note that the requesting node may execute many portions of the above flow chart concurrently and that a user may send several request for data 3301 without having to wait for decoding success 3331. If the user does not wish to request more data, execution may terminate 3386b.

It should be understood that the above description is only representative of illustrative embodiments. For the convenience of the reader, the above descriptions have focused on a representative sample of all possible embodiments, a sample that teaches the principles of the invention. The description has not attempted to exhaustively enumerate all possible variations. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that the embodiments and variations shown and described herein are merely illustrative of the principles of this invention and that various modifications may be implemented without departing from the scope and spirit of the invention.

The invention claimed is:

1. A system, comprising:
   a processor;
   a memory communicatively coupled to processor, the memory having stored therein computer-executable instructions, comprising:
      a mesh table module configured to maintain a mesh table that tracks a plurality of nodes that have available packets corresponding to parts of at least one file, wherein the parts are less than an entire file of the at least one file and the mesh table includes at least one field identifying respective packets available at respective nodes of the plurality of nodes; and
      an acknowledgment independent equalized data packet transfer mechanism module configured to:
         receive a request for a file of the at least one file from a requesting node;
         determine whether at least one node of the plurality of nodes has at least one available packet corresponding to at least one part of the file;
         in response to a determination that the at least one node of the plurality of nodes has the at least one available packet corresponding to the at least one part of the file, select a subset of the at one least node to send the at least one available packet to the requesting node and send at least one identifier of the subset of the at least one node to the requesting node; and
         in response to a determination that the plurality of nodes do not have the at least one available packet corresponding to the at least one part of the file, identify another file similar to the file.

2. The system of claim 1, wherein the acknowledgment independent equalized data packet transfer mechanism module is further configured to send at least one request instructing the subset of the at least one node to send the at least one available packet to the requesting node.

3. The system of claim 1, wherein the acknowledgment independent equalized data packet transfer mechanism module is further configured to select the subset based upon respective data transfer speeds associated with the nodes of the subset.

4. The system of claim 1, wherein the mesh table module is further configured to update the mesh table to indicate an additional available packet in response to a node of the plurality of nodes receiving a packet corresponding to a part of the at least one file.

5. A method, comprising:
   maintaining, by a device including a processor, a mesh table that tracks a plurality of nodes that have available packets corresponding to parts of at least one file, wherein the parts are less than an entire file of the at least one file and the mesh table includes at least one field identifying respective packets available at respective nodes of the plurality of nodes; and
   receiving, by the device, a request for a file of the at least one file from a requesting node; and
   determining, by the device, whether at least one node of the plurality of nodes has at least one available packet corresponding to at least one part of the file;
   in response to a determination that the at least one node of the plurality of nodes has the at least one available packet corresponding to the at least one part of the file, selecting, by the device, a subset of the at one least node to send the at least one available packet to the requesting node and sending, by the device, at least one identifier of the subset of the at least one node to the requesting node; and
   in response to a determination that the plurality of nodes do not have the at least one available packet corresponding to the at least one part of the file, identifying, by the device, another file similar to the file.

6. The method of claim 5, further comprising sending, by the device, at least one request instructing the subset of the at least one node to send the at least one available packet to the requesting node.

7. The method of claim 5, further comprising selecting, by the device, the subset based upon respective data transfer speeds associated with the nodes of the subset.

8. The method of claim 5, further comprising updating, by the device, the mesh table to indicate an additional available packet in response to a node of the plurality of nodes receiving a packet corresponding to a part of the at least one file.

9. A non-transitory computer-readable medium having instructions stored thereon that, in response to execution, cause at least one device including a processor to perform operations comprising:
   maintaining a mesh table that tracks a plurality of nodes that have available packets corresponding to parts of at least one file, wherein the parts are not an entire file of the at least one file and the mesh table includes at least one field identifying respective packets available at respective nodes of the plurality of nodes; and
   receiving a request for a file of the at least one file from a requesting node; and
   determining whether at least one node of the plurality of nodes has at least one available packet corresponding to at least one part of the file;
   in response to a determination that the at least one node of the plurality of nodes has the at least one available packet corresponding to the at least one part of the file, selecting a subset of the at one least node to send the at least one available packet to the requesting node and sending at least one identifier of the subset of the at least one node to the requesting node; and
   in response to a determination that the plurality of nodes do not have the at least one available packet corresponding to the at least one part of the file, identifying another file similar to the file.

10. The non-transitory computer-readable medium of claim 9, the operations further comprising sending at least one request instructing the subset of the at least one node to send the at least one available packet to the requesting node.

11. The non-transitory computer-readable medium of claim 9, the operations further comprising selecting the subset based upon respective data transfer speeds associated with the nodes of the subset.

12. The non-transitory computer-readable medium of claim 9, the operations further comprising updating the mesh table to indicate an additional available packet in response to a node of the plurality of nodes receiving a packet corresponding to a part of the at least one file.

\* \* \* \* \*